United States Patent [19]

Carlozzo et al.

[11] Patent Number: 4,923,348
[45] Date of Patent: May 8, 1990

[54] PROTECTIVE CAP CONSTRUCTION AND METHOD

[75] Inventors: Ben J. Carlozzo, Solon; Ronald J. Janoski, Chagrin Falls; James Sterk, Euclid; Mark C. Rundo, Strongsville, all of Ohio

[73] Assignee: Tremco Incorporated, Cleveland, Ohio

[21] Appl. No.: 309,528

[22] Filed: Feb. 13, 1989

[51] Int. Cl.$^5$ .................. F16B 19/00; F16B 33/00; F16B 37/14
[52] U.S. Cl. .................. 411/377; 411/431; 411/907; 411/903; 52/515
[58] Field of Search .................. 411/429–431, 411/371, 372, 377, 907, 908, 900, 901, 902, 903; 52/515; 152/367, 371

[56] References Cited

U.S. PATENT DOCUMENTS

| | | | |
|---|---|---|---|
| 2,710,113 | 6/1955 | Pritchard | 220/81 |
| 3,134,290 | 5/1964 | Jentoft . | |
| 3,470,787 | 10/1969 | Mackie . | |
| 3,548,704 | 12/1970 | Kutryk . | |
| 3,693,495 | 9/1972 | Wagner . | |
| 3,885,492 | 5/1975 | Gutshall . | |
| 4,143,454 | 3/1979 | Utsunomiya et al. | 29/460 |
| 4,316,690 | 2/1982 | Voller | 411/377 |
| 4,582,462 | 4/1986 | Thiel | 411/371 |
| 4,618,519 | 10/1986 | Koch et al. | 152/367 |
| 4,649,686 | 3/1987 | Backenstow | 52/509 |
| 4,826,380 | 5/1989 | Henry | 411/377 |

Primary Examiner—Neill R. Wilson
Attorney, Agent, or Firm—Konrad H. Kaeding

[57] ABSTRACT

A protective cap for fastener heads includes a preformed member formed of a naturally tacky compound of unvulcanized butyl rubber, a reinforcing layer of a non-woven polyester fabric, and a silicone-coated polyethylene release liner. The preformed member has a dome-shaped central portion and a surrounding generally flat annular flange. The reinforcing layer of the polyester fabric is disposed over a top surface of the preformed member to form a homogeneous cap construction, and the release liner covers the tacky bottom surface of the preformed member to prevent the cap from adhering to surfaces until ready for use. A plurality of the protective caps are formed in a manipulatable sheet unit and are maintained thereon by the natural tackiness of the unvulcanized butyl rubber compound. The caps are removed individually from the sheet unit, the liner is removed, and the cap is placed over an exposed fastener head so that the tacky bottom surface of the flange surrounding the fastener head adheres the cap to a surrounding surface and the tacky interior surface of the dome-shaped central portion adheres to the bolt head with the central portion being moldable about and encasing the fastener head.

7 Claims, 2 Drawing Sheets

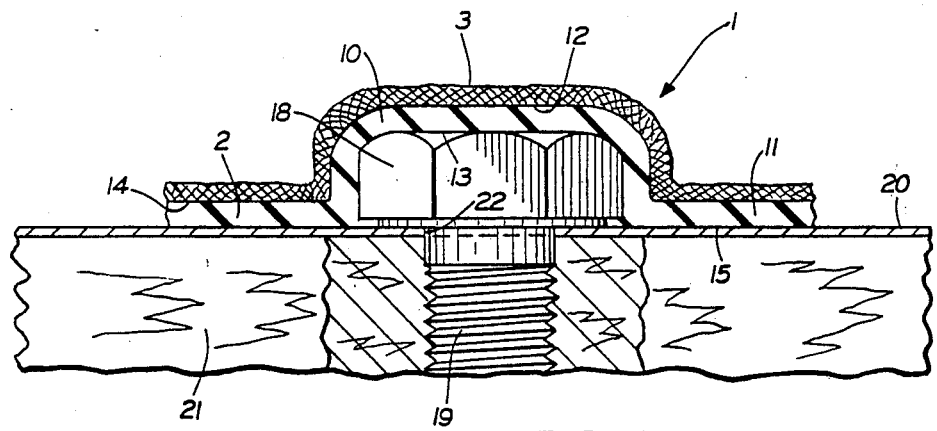
FIG. 5
FIG. 6
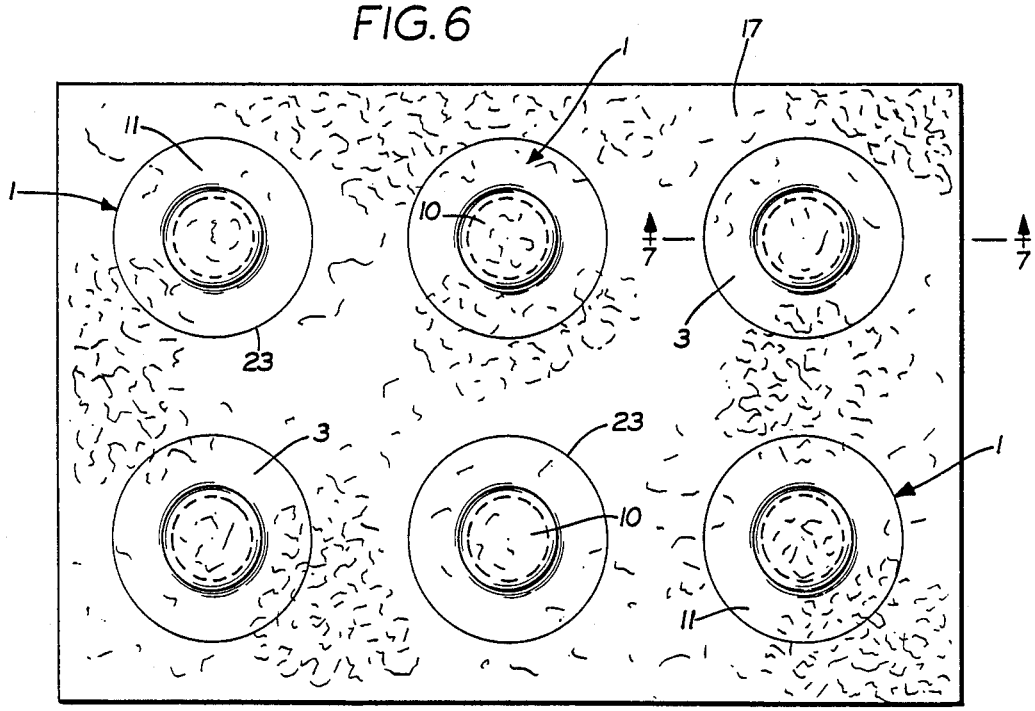
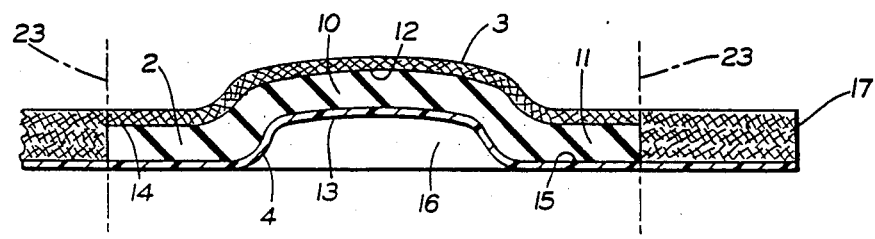
FIG. 7

PROTECTIVE CAP CONSTRUCTION AND METHOD

BACKGROUND OF THE INVENTION

1. Technical Field

The invention relates to protective caps and in particular to a construction and method for encasing fastener heads. More particularly, the invention relates to such a construction and method in which the cap is naturally adhesive, is moldable for encasing fastener heads of varying shapes and sizes, and is manufactured in a form which is easily stored and manipulated during installation.

2. Background Information

Fasteners such as bolts are used for innumerable fastening applications, including many outdoor applications or other applications where the fasteners are exposed to moisture. For example, bolts are commonly used for fastening metal roofing to the frame of commercial and industrial buildings, with the bolt heads typically being exposed to the outdoor environment. If the bolts are installed unprotected, moisture such as precipitation can seep through the bolt-receiving openings formed in the metal roof and into the interior of the building.

Various devices have been developed over the years for encasing fastener heads and/or sealing fastener-receiving openings. U.S. Pat. Nos. 3,134,290; 2,692,495 and 4,316,690 disclose molded plastic fastener heads. U.S. Pat. Nos. 2,688,497; 2,697,873; 2,927,495; 3,009,722 and 3,218,906 disclose various types of gaskets and the like for sealing fastener-receiving openings. U.S. Pat. Nos. 4,389,826 and 4,649,686 disclose protective coverings for fastener heads. U.S. Pat. Nos. 3,548,704; 3,885,492 and 4,582,462 disclose snap-fitted protective caps for fasteners.

The closest known prior art to our improved protective cap and method is shown in U.S. Pat. Nos. 2,710,113; 3,470,787 and 4,143,454. Patent No. 2,710,113 discloses pliable rubber protective caps for fasteners which are placed in position over a fastener, and which require a separate external sealer, as well as a separate internal sealer for filling the void within the cap adjacent to the fastener. In contrast, our improved protective cap is self-adhesive and does not require separate sealers, and is moldable about the fastener to eliminate the need for internal sealers. Patent No. 3,470,787 also discloses a protective cap for fasteners which is dome-shaped and is filled with a separate sealing material such as silicone rubber. Patent No. 4,143,454 discloses yet another protective cap which utilizes a separate sealing material.

Heretofore, another common sealing device and method for protecting fastener bolt heads, especially of the type used on metal roofs, was by manually applying a caulking or sealing compound about each individual bolt head. Such procedure is extremely time consuming and expensive.

Therefore, the need exists for a protective cap construction and method in which the cap effectively seals fastener heads of varying shapes and sizes without requiring separate adhesives, and which can be conveniently stored and handled in the field.

SUMMARY OF THE INVENTION

Objectives of the invention include providing a protective cap construction and method which effectively protects and seals fastener heads without requiring separate sealing materials internally or externally of the sealing cap.

Another objective of the invention is to provide such a protective cap construction and method which is moldable about fastener heads enabling a single cap size to be used for various shapes and sizes of bolt heads without sacrificing the sealing ability of the cap.

A further objective of the invention is to provide such a protective cap construction and method which is convenient to store and easy to work with in the field; and in which a plurality of such caps are retained in a single sheet for individual removal.

Still another objective of the invention is to provide such a protective cap construction and method in which the cap is strong, dimensionally stable, puncture-resistant, water-resistant, rot and mildew resistant, and economical to manufacture.

A still further objective is to provide such a cap which is formed of a compound or sealant of unvulcanized butyl rubber whereby the natural tackiness of the rubber is sufficient for adhering the cap to the roof and protected bolt or fastener head; in which an outer layer of a non-tacky fabric strengthen the butyl rubber compound and provides an exposed non-tacky surface on the roof surface; and in which a readily removable release liner covers the tacky bottom surface of the cap until ready for application to the fastener head and surrounding roof surface.

These objectives and advantages are obtained by the improved protective cap construction of the invention, the general nature of which may be stated as a protective cap construction for fastener heads, including a preformed member formed of a compound of unvulcanized butyl rubber having a dome-shaped central portion and a surrounding generally flat annular flange, the central portion and flange having top and bottom surfaces with the bottom surfaces being tacky, a reinforcing layer of a polyester fabric disposed over the top surfaces of the dome-shaped central portion and annular flange to form a homogeneous construction, and a polyethylene release liner covering the tacky bottom surfaces of the preformed member, so that the liner can be removed and the preformed member placed over an exposed fastener head, with the bottom surface of the flange surrounding the head and adhering the member to a surrounding surface and with the dome-shaped central portion adhering to and generally encasing the fastener head.

The objectives and advantages are further obtained by the method of the invention, the general nature of which may be stated as including a method of forming a protective cap for fastener heads, including the steps of extruding an elongated sheet of a tacky, unvulcanized compound of butyl rubber having top and bottom surfaces, disposing a reinforcing layer of a polyester fabric on the top surface of the elongated sheet to form a homogeneous construction, covering the bottom surface of the elongated sheet with a releasable polyethylene liner, die punching the elongated sheet and forming a plurality of the protective caps in the sheet, the caps each having a dome-shaped central portion and a surrounding generally flat annular flange, with the tackiness of the unvulcanized compound of butyl rubber maintaining the formed caps on the elongated sheet until the caps are removed for use, and cutting the elongated sheet into a plurality of manipulatable sheet units, the sheet units each having a plurality of the protective caps retained therein.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 5 is a fragmentary sectional view, with portions broken away and in section, of the improved protective cap encasing a fastener head on a roof surface;

FIG. 6 is a top plan view of one of the sheet units having a plurality of the protective caps formed therein; and FIG. 7 is a fragmentary sectional view taken on line 7—7, FIG. 6.

Similar numerals refer to similar parts throughout the drawings.

DESCRIPTION OF THE PREFERRED EMBODIMENT

Figure 1:
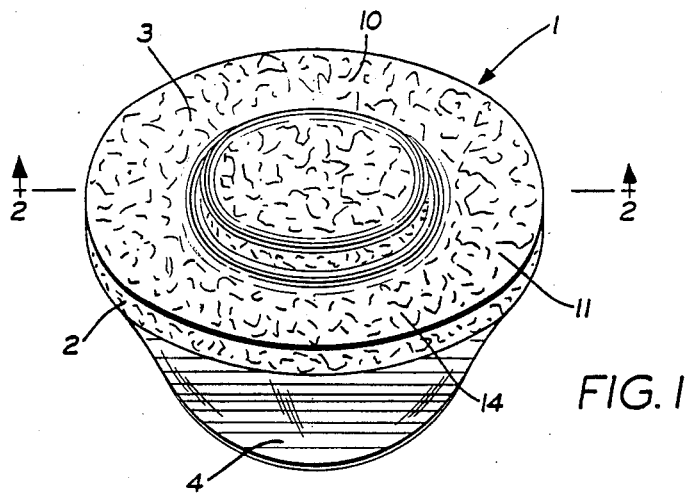
FIG. 1 is a perspective view of the protective cap construction of the present invention, showing the release liner partially removed from the preformed member.

The improved protective cap construction of the present invention is indicated generally at 1, and is shown in particular in FIG. 1. Protective cap 1 includes a preformed member 2, a reinforcing layer 3, and a release liner 4 (FIGS. 2-4).

In accordance with one of the main features of the invention, preformed member 2 is formed of an unvulcanized compound of butyl rubber which is a naturally tacky material which provides sufficient adhesion for effectively bonding the protective cap to various types of surfaces as described in greater detail below. Preformed member 2 has a dome-shaped central portion 10 and a surrounding generally flat annular flange 11 (FIGS. 1-4). Central portion 10 and annular flange 11 each have top and bottom surfaces 12-13 and 14-15, respectively, with central portion 10 extending outwardly of top surface 14 of annular flange 11 forming an internal cavity 16 therein.

One type of compound of butyl rubber suitable for the formation of preformed member 2 is comprised by weight of 10% butyl rubber; 20% of a process oil such as Polybutene or Paraffinic oil; a small percentage of a surfactant; approximately 2-3% of a tacifying resin; and with the remainder being an inorganic filler such as talc and calcium carbonate. Other types of commercially available butyl rubber compounds may be used without effecting the concept of the invention.

Figure 2:
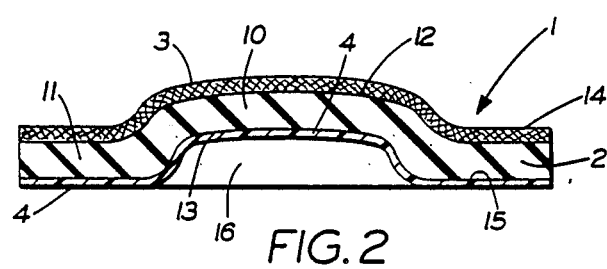
FIG. 2 is a sectional view taken on line 2—2, FIG. 1.
Figure 3:
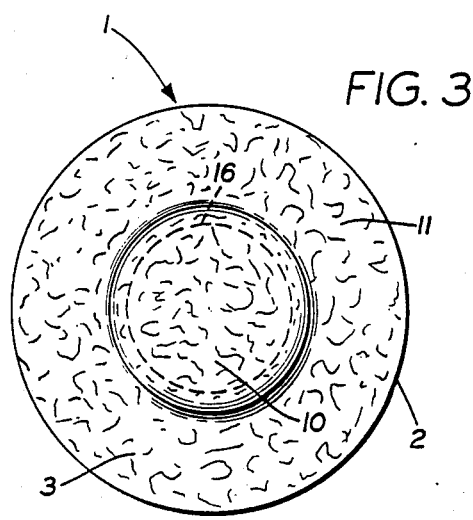
FIG. 3 is a top plan view of the protective cap of FIG. 1.
Figure 4:
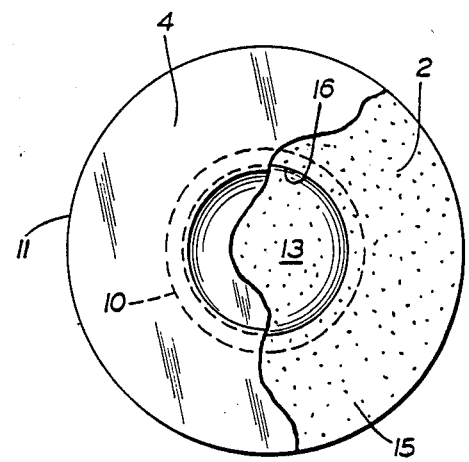
FIG. 4 is a bottom plan view of the cap of FIG. 1, with the release liner being partially broken away.

Reinforcing layer 3 preferably is comprised of nonwoven polyester fabric, the fibers of which may be randomly located, which is disposed over top surface 12 of dome portion 10 and top surface 14 of annular flange 11 of preformed member 2 to form a homogeneous construction with the butyl rubber preformed member (FIGS. 1-3). The non-woven polyester fabric of reinforcing layer 3 preferably are spunbond polyester and may be of the type identified by the trademark LU-TRADUR LD 7230 and manufactured by the Lutravil Company of Durham, N.C. Reinforcing layer 3 provides strength and dimensional stability to preformed member 2 of cap 1, and is water-resistant, puncture-resistant, and rot and mildew resistant. Reinforcing layer 3 also detackifies the exposed top surfaces of preformed member 2 and flange 11. This prevents the caps from being accidently pulled away from the protected bolt head by someone walking on the roof.

Release liner 4 cover exposed tacky bottom surface 15 of annular flange 11 to prevent preformed member 2 from adhering to surfaces until ready for use (FIGS. 1, 2 and 4). Liner 4 preferably is a polyethylene film coated on one side with a solvent silicone for easy and consistent release characteristics from tacky bottom surface 15 of flange 11. One type of release liner found suitable is a 2½ mil natural medium density film manufactured by Daubert Coated Products, Inc., and has the following product identification code: 1 - 2.5MDPE(-NAT.)-164Z.

The method of forming protective cap construction 1 is another feature of the invention and is set forth below. An elongated sheet (not shown) of the tacky, compound of unvulcanized butyl rubber having top and bottom surfaces is extruded in a generally continuous sheet form in a usual extruder. A reinforcing layer surface of the elongated sheet of butyl rubber to form a homogeneous construction, and the tacky bottom surface of the elongated sheet is covered with a releasable polyethylene liner preferably in a continuous manufacturing process hereto fore used for forming such material in strip form for use in sealing seams of the roof panels.

The elongated sheet, having the reinforcing layer and releasable liner disposed thereon, then is die-punched for preforming a plurality of protective caps 1 in the sheet. The die-punching method provides the dome-shaped central portion 10 in each of the caps. The die also scores each cap 1 along the periphery of its annular flange 11, as illustrated by dot-dash score lines 23 shown in FIG. 7. The scoring enables the caps to be easily separated from sheet unit 17 when needed for an application. During storage and prior to removal of caps 1 from sheet unit 17 at job-site, the preformed caps are maintained on the sheet unit by the natural tackiness of the unvulcanized butyl rubber compound of the caps and sheet unit, which causes adherence of the caps and sheet unit to one another even though the caps have been die-punched in the sheet. The elongated sheet then is cut into a plurality of manipulatable sheet units 17, one of which is illustrated in FIG. 6, with each sheet unit 17 having a plurality of protective caps 1 formed therein.

The improved protective cap of the present invention is intended primarily for protecting and sealing the heads of fastener on metal roofs, with a particular example of such an application being set forth below and shown in the drawings in FIG. 5. One of the preformed protective caps 1 is manually removed from sheet unit 17 (FIG. 6) by applying sufficient pressure to the cap to separate its annular flange 11 from the sheet unit along score lines 23. Release liner 4 then is manually removed from tacky bottom surface 15 of annular flange 11. The cap then is placed over an exposed head 18 of bolt 19 which is used to fasten a metal roof panel 20 on a wooden truss 21 or other type of roof deck of a commercial or industrial building. Bottom surface 15 of flange 11 surrounds bolt head 18 and adheres the cap to roof panel 20. Dome-shaped central portion 10 of the cap then is manually pressed about the bolt head and firmly adheres thereto and completely encases the bolt head sealing it from moisture. Most importantly, central portion 10 and flange 11 completely seal the area of contact between the bolt head and roof panel preventing the passage of moisture therebetween. The formation of preformed member 2 of cap 1 from a compound or sealant of unvulcanized butyl rubber, a type of compound well known in the art, enables dome portion 10 of the cap to be moldable about bolt hex head 18 providing for better sealing characteristics. This moldability of the cap also enables the cap to be used for protecting and sealing fastener heads of various shapes and sizes. To enhance the adhesiveness of annular flange 11 of the cap to a metal surface such as roof 20, an epoxy aluminum primer can be applied to the roof adjacent to the bolts to be covered, if desired.

Thus, it can be seen that protective cap 1, when used in the above-described manner, effectively seals bolt-receiving opening 22 formed in metal roof panel 20 against infiltration by outdoor elements such as moisture, to insure a dry and weatherproof interior climate in the building below.

Again, one of the important features of the invention is the naturally tacky characteristic of the compound of unvulcanized butyl rubber material which forms preformed member 2, and which enables bottom surfaces 15 and 14 to adhere to roof surface 20 and bolt head 18 without the need for application of separate sealers and the like, as required in many prior art protective caps. In addition, the unvulcanized butyl rubber compound used in the formation of preformed member 2 enables the cap to be used with different shapes and sizes of fastener heads. Another important feature of the invention is the method of manufacture of the caps, wherein the caps are formed in easy to store and handle sheets.

In addition, reinforcing layer 3 of a non-woven polyester fabric enables cap 1 to be used on a metal roof without impeding foot traffic on the roof, or in other applications where contact with the caps is likely. More particularly, the polyester fabric detackify the exposed top surface of the cap to prevent it from adhering to a workman's boot or other objects. Moreover, the reinforcing layer adds strength and dimensional stability to the cap, and is puncture resistant, water resistant and resistant to rot and mildew.

Accordingly, the improved protective cap construction and method is simplified, provides an effective, safe, inexpensive, and efficient construction and method which achieves all the enumerated objectives, provides for eliminating difficulties encountered with prior cap constructions and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved protective cap is constructed and the method carried out, the characteristics of the cap and method, and the advantageous, new and useful results obtained; the new and useful structures, devices, elements, arrangements, parts, method steps, and combinations, are set forth in the appended claims.

We claim:
1. A protective cap construction for fastener heads including:
    (a) a preformed member formed of an unvulcanized compound of butyl rubber having a natural tackiness and having a dome-shaped central portion and a surrounding generally flat annular flange, said central portion and flange having top and bottom surfaces with said surfaces being tacky;
    (b) a reinforcing layer of polyester fabric disposed over the top surfaces of the dome-shaped central portion and annular flange and adhered thereto by the natural tackiness of the butyl rubber to form a homogeneous member; and
    (c) a polyethylene release liner covering the tacky bottom surface of the annular flange, so that said liner can be removed and the preformed member placed over an exposed fastener head, with the natural tackiness of the bottom surface of the flange surrounding said head adhering said member to a surrounding surface and with the natural tackiness of the dome-shaped central portion adhering to and generally encasing said fastener head, with said preformed member remaining in its unvulcanized natural tackiness condition to protect the fastener head and to provide a waterproof seal between the fastener head and surrounding surface.

2. The construction defined in claim 1 in which the dome-shaped central portion extends outwardly of the top surface of the annular flange.

3. The construction defined in claim 1 in which the polyester fabric of the reinforcing layer is non-woven, formed of randomly located fibers.

4. The construction defined in claim 1 in which the polyethylene release liner is coated on one side with a solvent silicone providing for release of said liner from the tacky bottom surface of the annular flange.

5. A protective cap construction for fastener heads including:
    (a) a preformed member formed of an unvulcanized compound of butyl rubber having a natural tackiness and having a central portion and a surrounding generally flat flange portion, said central portion and flange portion having top and bottom surfaces with said surfaces being tacky;
    (b) a fabric reinforcing layer disposed over the top surfaces of the central portion and flange portion and adhered thereto by the natural tackiness of the butyl rubber to form a homogeneous member; and
    (c) a release liner covering at least the tacky bottom surface of the flange portion and adhered thereto by the natural tackiness of the butyl rubber, so that said liner can be removed and the preformed member placed over an exposed fastener head, with the natural tackiness of the bottom surface of the flange portion surrounding said head adhering said preformed member to a surrounding surface and providing a waterproof seal between the fastener head and surrounding surface and with the natural tackiness of the central portion adhering to and generally encasing said fastener head, with said preformed member remaining in its unvulcanized natural tackiness condition.

6. The construction defined in claim 5 in which the central portion is dome-shaped and the flange portion being annular and surrounding said dome-shaped central portion.

7. The construction defined in claim 5 in which the fabric reinforcing layer is formed of polyester and the release liner is formed of polyethylene.

* * * * *